United States Patent [19]
Proksch et al.

[11] 3,762,489
[45] Oct. 2, 1973

[54] ACOUSTICAL ENGINE ENCLOSURE FOR EARTHMOVING VEHICLES

[75] Inventors: Frederick D. Proksch, Peoria; Robert M. Alt, Washington; James E. Lagemann, East Peoria; Eugene O. Mossner; John R. Rediger, both of Washington, all of Ill.

[73] Assignee: Caterpillar Tractor Co., Peoria, Ill.

[22] Filed: Apr. 19, 1971

[21] Appl. No.: 135,065

[52] U.S. Cl. ............................ 180/69 R, 181/33 K
[51] Int. Cl. ............................................. F01n 1/24
[58] Field of Search ..................... 180/54 A, 68, 69; 181/33 GB, 33 K

[56] References Cited
UNITED STATES PATENTS
3,478,958   11/1969   Hinck et al. ................ 181/33 K X FOREIGN PATENTS OR APPLICATIONS
442,873   1/1968   Switzerland ...................... 181/33 K
835,340   5/1960   Great Britain .................... 181/33 K Primary Examiner—Robert G. Sheridan
Attorney—Fryer, Tjensvold, Feix, Phillips & Lempio

[57] ABSTRACT

An engine enclosure for earthmoving vehicles, with panels in the sides, front end and top thereof which contain acoustic baffles which attenuate noise emanating from within the engine compartment and which define passages for directing the flow of air through the compartment to satisfy engine cooling requirements. The side panels are hinge-mounted to provide facile access to the engine compartment.

13 Claims, 21 Drawing Figures

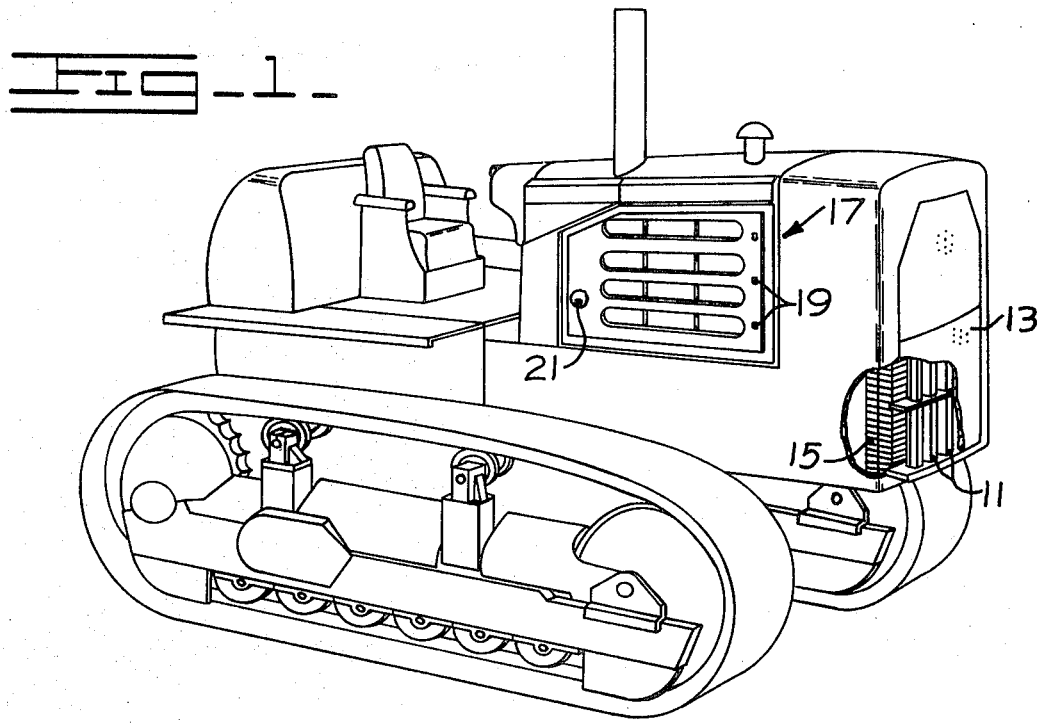
Fig_1_
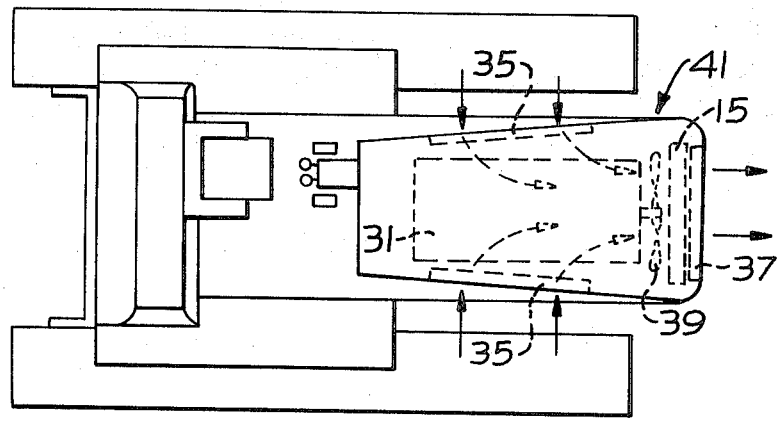
Fig_2_
INVENTORS
FREDERICK D. PROKSCH
ROBERT M. ALT
JAMES E. LAGEMANN
EUGENE O. MOSSNER
JOHN R. REDIGER
BY
ATTORNEYS

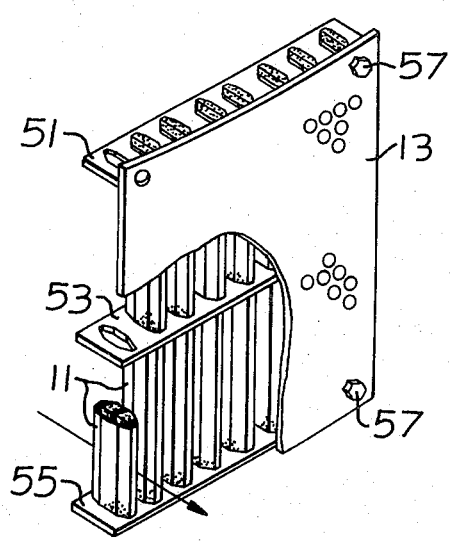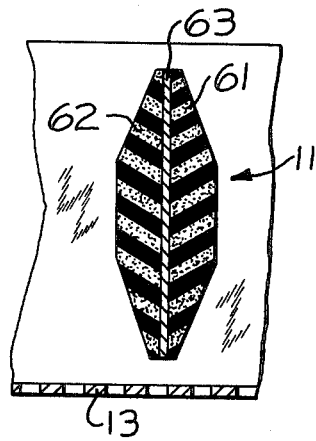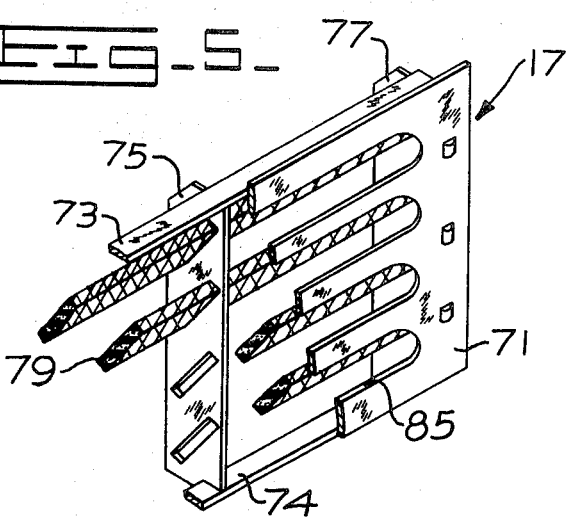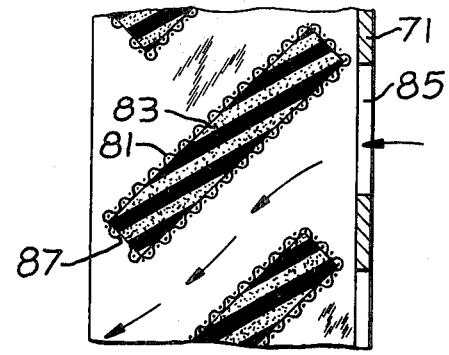

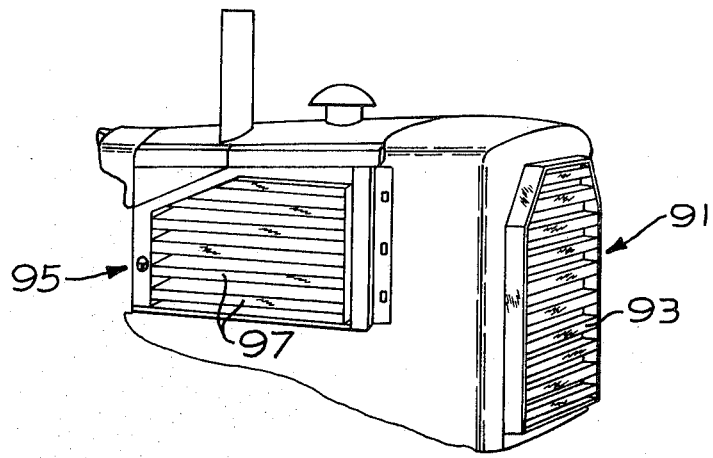
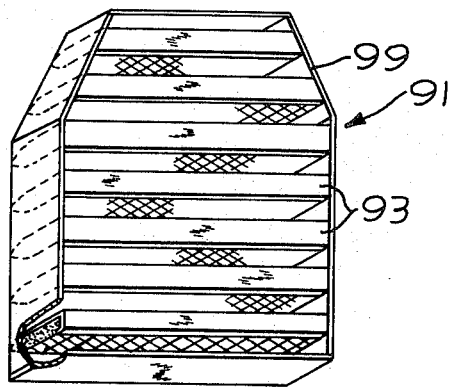
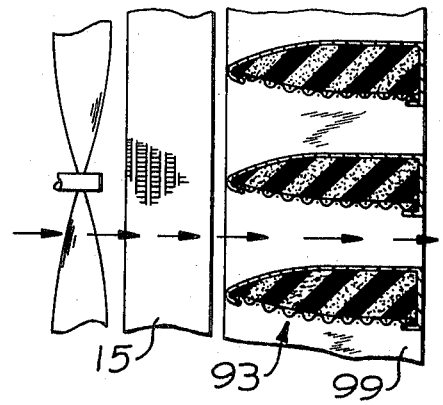
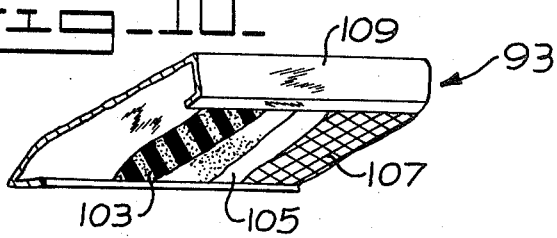

INVENTORS
FREDERICK D. PROKSCH
ROBERT M. ALT
JAMES E. LAGEMANN
EUGENE O. MOSSNER
JOHN R. REDIGER

BY

ATTORNEYS

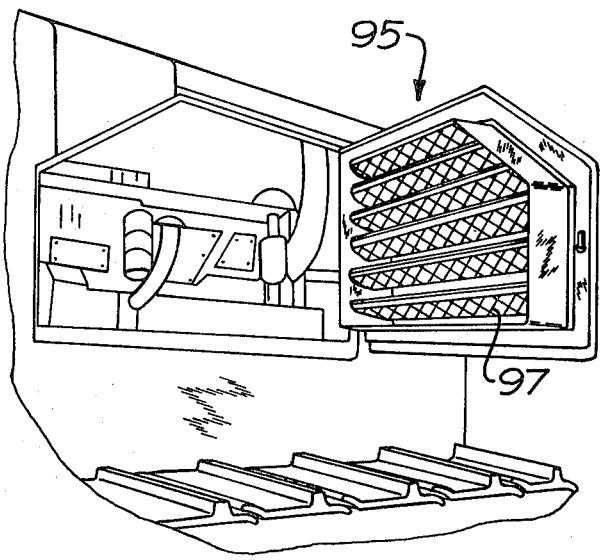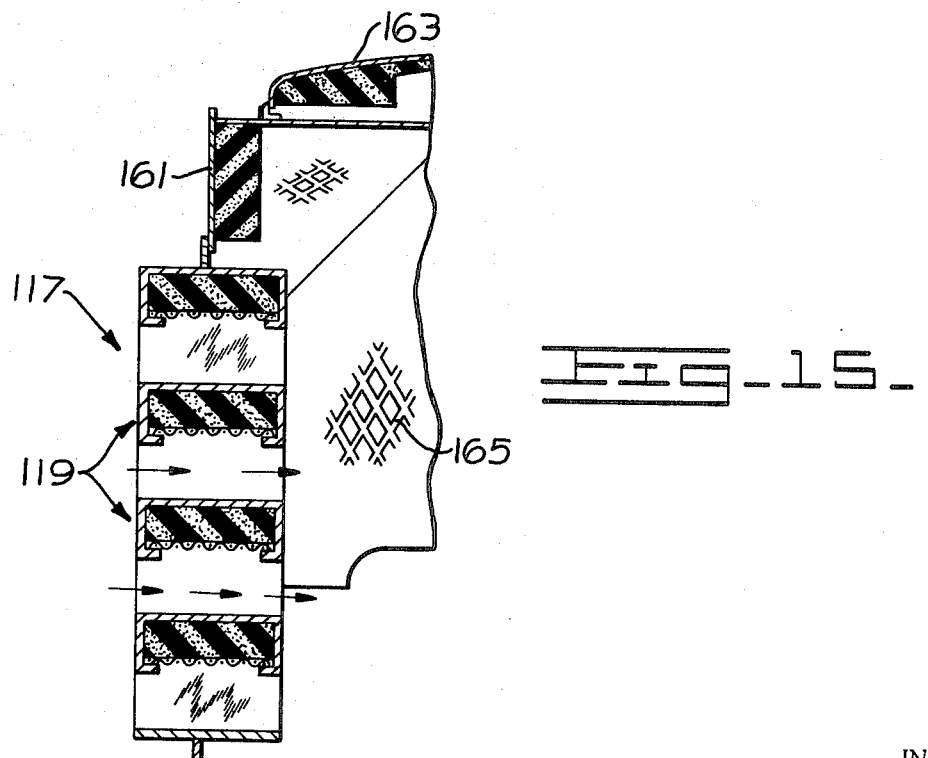

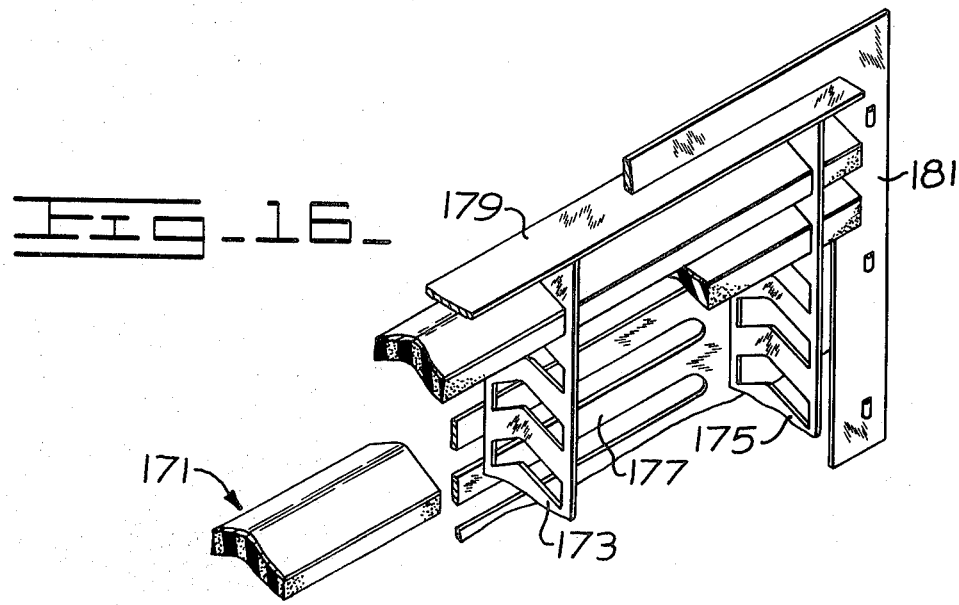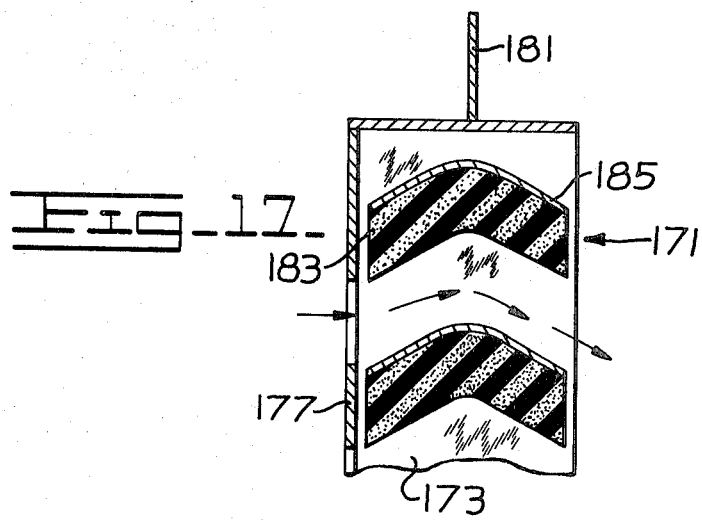

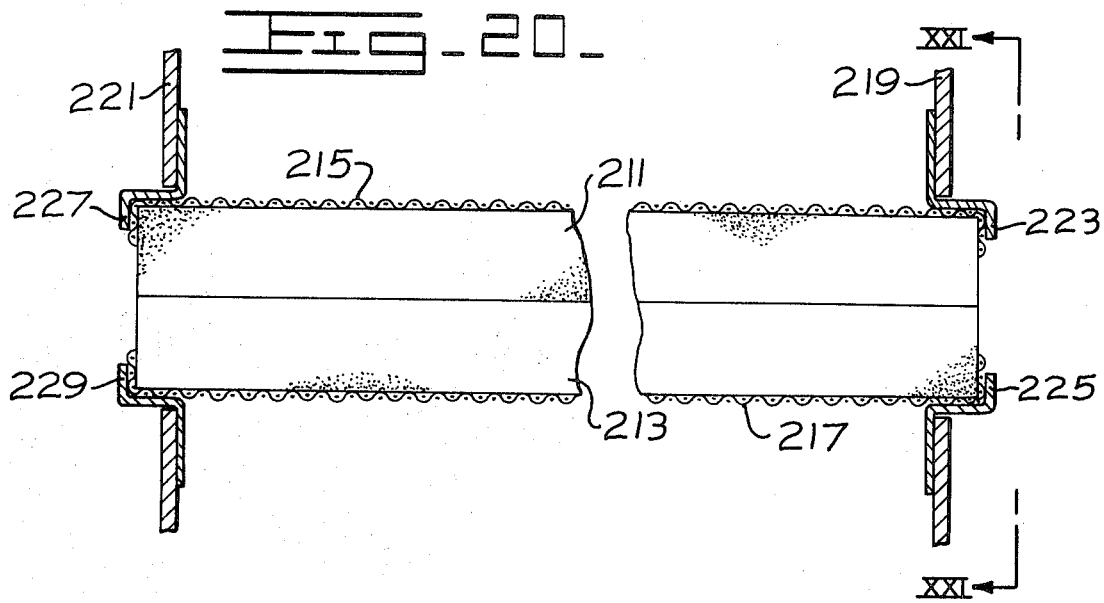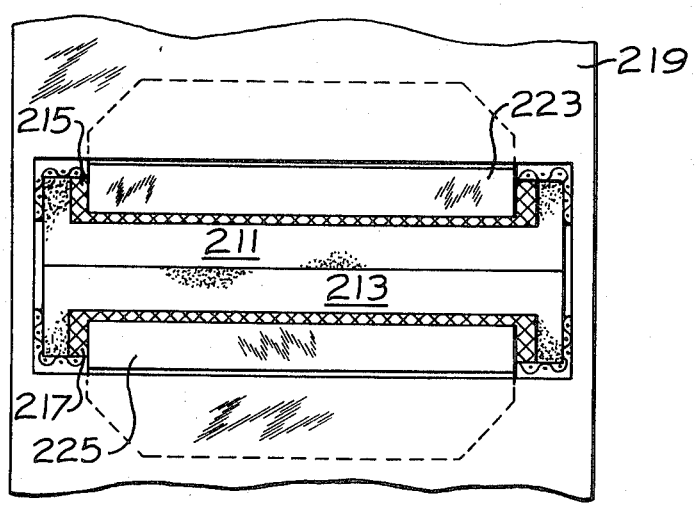

3,762,489

ACOUSTICAL ENGINE ENCLOSURE FOR EARTHMOVING VEHICLES

BACKGROUND OF THE INVENTION

The enclosure for the engine compartment of a conventional earthmoving machine generally consists of a sheet-metal hood, sides, a dash portion, a radiator guard, and a bottom pan. The primary purpose of such an enclosure is to protect the engine and ancillary equipment from rocks, branches, and other elements that could cause damage. Normally, openings protected by perforated "brush-guard" type panels are present on the sides of the enclosure. These panels provide access to the engine compartment and offer minimal restriction to engine-cooling air flow. Similarly, the radiator end of the enclosure is protected by a perforated guard.

Recent Federal legislation applicable to earthmoving machinery has imposed rather stringent limitations upon the noise levels to which operators and spectators are exposed. The aforementioned, conventional, engine compartment enclosure will not meet these new limitations in many cases.

Noise-attenuation treatment for engine compartments is common practice in the automotive field. This treatment generally consists of the installation of sound-absorptive insulating materials under the hood, the inclusion of floor mats and the provision of other sound-dissipative elements where needed. These automotive practices are also applicable to earthmoving-vehicle engine enclosures to provide much-needed acoustic damping for the large-area, sheet-metal surfaces encountered in the hood and dash areas in such machines.

Attempts have been made to control noise transmission through the radiator-cooling fan system in earthmoving machines by improving fan design and through use of acoustic shrouding. Acoustically-treated external shrouding is, however, vulnerable and susceptible to damage, and often adds to the overall dimension of the machine.

The complete enclosure of the sides and frontal portions of the engine compartment would virtually eliminate spectator and operator noise-exposure levels. However, such a practice would place restrictive requirements on the engine-cooling system since normally the dash and bottom pan areas of the compartment are substantially closed and without access to air. By eliminating the side and frontal portions, engine cooling characteristics would be favorable but noise exposure would be excessive. Thus, there is a trade-off between optimum cooling conditions and favorable noise-attenuation characteristics.

This invention provides a rugged, effective, noise-attenuating engine enclosure which permits easy access to the compartment for service and repair functions, and which also provides adequate air-flow openings for engine cooling.

SUMMARY OF THE INVENTION

This invention relates to an engine compartment enclosure, particularly adaptable to earthmoving vehicles, consisting of panels integral with the enclosure and containing a plurality of elongated baffles which provide effective noise dissipation and allow cooling air to flow with minimal restriction through the compartment.

It is an object of this invention to reduce the noise level outside the engine compartment of an earthmoving vehicle to produce greater safety and comfort for an operator or spectator.

It is another object of this invention to construct a noise-attenuating panel as part of an engine enclosure by arranging a series of elongated acoustic baffles in parallel, spaced-apart relationship within the panel, permitting the flow of cooling air therebetween, and inhibiting the direct transmission of noise from within the compartment.

It is yet another object of this invention to provide a noise-absorbing panel for the engine enclosure of an earthmoving vehicle which is hinge-mounted, permitting easy access to the aforementioned enclosure.

Still another object of this invention is to provide effective acoustic baffles which are easily cleaned or replaced.

Yet another object of this invention is to provide an effective noise-attenuating engine enclosure for earthmoving vehicles which does not compromise the salient design features of the aforementioned vehicle, i.e., significantly increase the nominal length or width of the basic enclosure.

Other objects and advantages of this invention will become apparent from the following description and claims.

BRIEF DESCRIPTION OF THE DRAWINGS

FIG. 1 is a partially-sectioned, perspective view of a typical earthmoving vehicle showing acoustic panels in the side and front of the engine enclosure;

FIG. 2 is a schematic, top-elevation view of the earthmoving vehicle illustrated in FIG. 1, and showing the air-flow pattern within the compartment;

FIG. 3 is a sectioned, isometric view of the lower radiator guard panel of the machine illustrated in FIG. 1;

FIG. 4 is a fragmentary, sectional view of the panel of FIG. 3 showing the baffle construction in detail;

FIG. 5 is a sectioned, isometric view of a side panel for the engine enclosure illustrated in FIG. 1;

FIG. 6 is a fragmentary, sectional view of the panel of FIG. 5 showing the baffle construction in detail;

FIG. 7 is a partial perspective view of an earthmoving machine showing alternate acoustic panel configurations on the front and sides of the engine enclosure;

FIG. 8 is a partially-sectioned, isometric view of the front acoustic panel as shown in the FIG. 7 enclosure;

FIG. 9 is a fragmentary, sectional view of the fan, radiator and acoustic panel of the FIG. 7 embodiment;

FIG. 10 is an enlarged, fragmentary, isometric view showing the specific construction of baffles comprising the FIG. 8 panel;

FIG. 14 is a perspective view of the engine-compartment area of a typical earthmoving machine showing an acoustic panel mounted on hinges and opened for access into the compartment interior;

FIG. 15 is a partial section of a side panel and portion of the hood and end wall of an alternate baffle construction;

FIG. 16 is a sectioned, isometric view of an alternate acoustic side panel configuration;

FIG. 17 is an enlarged, partial section of the panel shown in FIG. 16;

FIG. 20 is a sectional view of still another baffle construction illustrating an alternate mounting method; and FIG. 21 is a sectional view taken along the line XXI—XXI in FIG. 20 showing details of the baffle construction and retaining clip.

DESCRIPTION OF THE PREFERRED EMBODIMENTS

Figure 11:
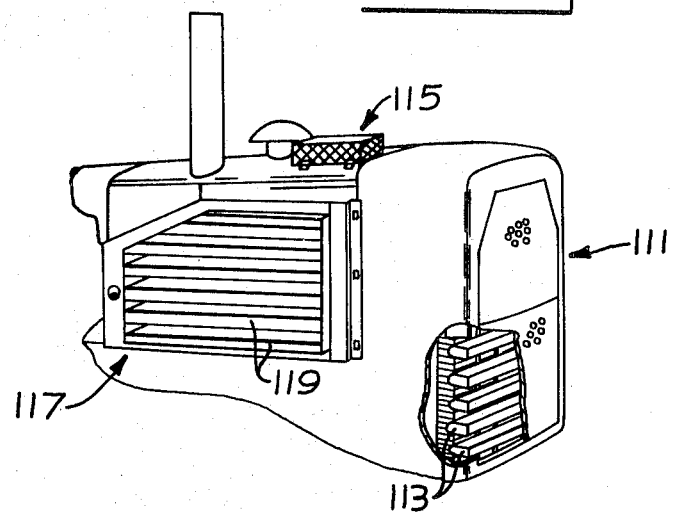
FIG. 11 is a partially-sectioned, perspective view of an earthmoving machine showing the engine enclosure with alternate acoustic panel configurations.

A section of the engine compartment enclosure of an earthmoving machine is broken away in FIG. 1 to show a series of vertical acoustic baffles 11 located between a conventional radiator guard 13 and a radiator 15. A side panel assembly, shown generally at 17, covers a normally-open area of the conventional enclosure, and is mounted on hinges, as indicated by 19. The panel is secured by a standard combination handle and latch mechanism 21.

The air-flow path indicated by arrows in FIG. 2 provides cooling for the engine 31 and radiator 15. Cool air enters engine enclosure 41 through a pair of side panels 35, then is drawn across the engine by fan 39 which then exhausts the air through radiator 15 and a front panel 37. If desired, the flow direction could be reversed by changing fan 39 so that air is drawn in through front panel 37 and then subsequently exhausted through side panels 35. Although the flow direction as shown in FIG. 2 is preferred, the various panel and baffle configurations to be detailed in the following embodiments are operative with either flow direction. In the interest of consistency, the FIG. 2 flow direction will be adopted and, where applicable, will be indicated by arrows in the remaining illustrations.

The construction of the lower radiator guard panel of FIG. 1 is shown more clearly in FIG. 3, and is a complete assembly, being preassembled and installed as one piece onto the engine-enclosure framework by means of bolts such as shown at 57. The subassembly is fabricated by attaching top plate 51, center plate 53, and bottom plate 55 to perforated guard panel 13. The attachment of the plates to the front panel may be by welding or other means such as clips or brackets which are not shown. Top plate 51 and center plate 53 have openings corresponding to the cross-sectional shape of baffle elements 11. The baffle members are inserted first through the top plate, then through to center plate, until the lower end of the baffle comes to rest against the bottom plate. This operation is simply reversed to withdraw the baffles for cleaning or replacement.

The specific details of the baffle elements 11 are shown in FIG. 4. Two pieces, 61 and 62, of acoustic material such as polyurethane foam, or the like, are cut or molded to the cross section shown, cut to the desired length, and glued or otherwise attached to a support plate 63 which provides the necessary stiffness for the members. The exposed surfaces of the acoustic material provide effective, noise-dissipative means which attenuate airborne noise emanating from within the engine compartment.

The particular acoustic material utilized for the baffles should have a specific flow resistance of approximately 0.005 pound-seconds per inch$^4$. For a detailed discussion of this parameter, reference may be made to NOISE REDUCTION by Beranek, published by McGraw-Hill, p. 248 (1060). Flexible, open-cell foams such as polyester-based urethane, with a density of approximately 2 pounds per cubic foot have been found to be particularly suitable. However, appropriate types of sintered metal and fiberglass materials having the above-mentioned specific flow resistance could be used.

The construction of side panel 17 (FIG. 1) is detailed in FIG. 5. An outer member 71 and a plurality of vertical plates such as 75 and 77 are secured to horizontal plates 73 and 74. The vertical plates have openings slightly smaller than the normal cross-sectional shape of baffle members 79. Baffles 79 are inserted from one end, through the openings in successive vertical plates, until properly positioned within the panel. Since the openings in the vertical plates are slightly smaller than the baffle sections, the baffles will be lightly compressed at the point of contact with the vertical plate and held securely in place. Reversal of the installation procedure permits the baffle members to be withdrawn for servicing or replacement.

Details of the baffle members of side panel 17 are shown in FIG. 6. An acoustic material batt 83, having a rectangular cross section, is almost entirely enclosed by a screen or expanded metal covering 81. An opening 87 in the enclosure member, running along the entire length of the baffle, is provided so that the batt may be lightly compressed as it passes through the vertical plates in the panel. Additionally, this opening permits the enclosure member 81 to be expanded for easy replacement or cleaning of the acoustic core.

The flow path of air entering the compartment through opening 85 and indicated by arrows in FIG. 6 is counter to the noise radiation path. To reach outside, airborne noise generated within the enclosure must assume a circuitous path around the baffle, thereby being partially absorbed by the surfaces of the baffles.

The engine enclosure of FIG. 7 illustrates alternate acoustic panel configurations. Front panel 91 contains horizontal baffles 93, and side panel 95 contains horizontal baffle elements 97.

In FIG. 8, front enclosure 91 of FIG. 7 is shown in greater detail. Baffle elements 93 are mounted inside a metal frame 99 by welding or other attachment means, providing a rugged, durable panel which replaces the conventional radiator guard.

The respective relationship of the fan, radiator and front panel of the FIG. 7 embodiment can be more clearly seen in FIG. 9. The leading edges of baffle elements 93, being the edge adjacent to the radiator 15, are tapered to reduce upstream blockage of the radiator. As shown in more detail by FIG. 10, baffle 93 comprises a shaped foam core 103, covered by a loosely-fitting, protective film 105, such as polyethylene, Mylar, or the like, a screen or expanded metal panel 107, and a fabricated, sheet-metal containment case 109. The film-encased core 103 may be replaced by first removing bottom screen member 107, which is not fixedly attached to outer case 109. When in place, the foam is lightly compressed, serving to hold the core, film, and bottom metal panel securely in place.

Earthmoving equipment, for which these panels are designed, is required to operate in an environment that quickly deteriorates acoustic foam materials. Airborne dust and oil fill the open cells in acoustic foam, resulting in severe degradation of the foam's acoustic properties. By enclosing the acoustic core within the aforementioned envelope of film 105, which is impervious to dust, dirt and oil, the normal service life of the element is greatly extended. By wrapping the film around the acoustic core loosely, it has been found that there will be no appreciable loss of the noise-attenuating properties of the baffle. Although greatly extending the service life of the acoustic foam core, the plastic film casing is itself susceptible to deterioration and tearing. Accordingly, an important feature of this invention is the ability to easily replace and service the individual baffle elements.

Additional panel constructions are illustrated in FIG. 11. This engine enclosure contains a front panel 111 having baffle elements 113, a top access member 115, and a side panel member 117 having baffle elements 119.

Figure 12:
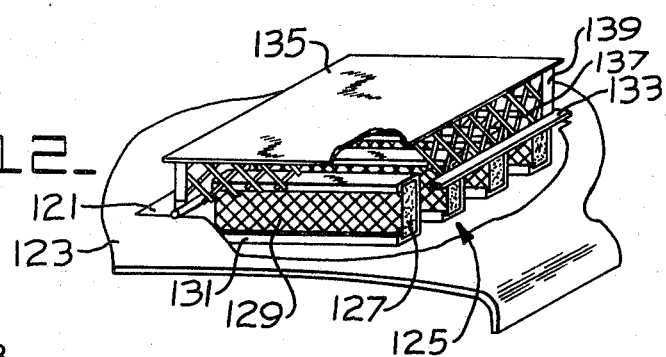
FIG. 12 is an enlarged, partially-sectioned view of an acoustic panel located in the hood area of the enclosure as shown in FIG. 11.

Top member 115 is shown in more detail in FIG. 12. This member is mounted by hinges 121 onto a vehicle hood 123. Opening the top member provides access to the engine compartment for normal under-hood service functions. This panel contains baffle elements 125 consisting of a foam core 127 held in place by a metal grid 129 within a metal, U-shaped channel 131. Metal channel 131 is secured to frame member 133 which is the bottom member of a cover consisting of top plates 135, expanded metal sides 137, and vertical supports 139. This cover provides an additional inlet for cooling air, access for the aforementioned service operations, and acoustic baffle elements to attenuate noise emanating from within the enclosure.

Figure 13:
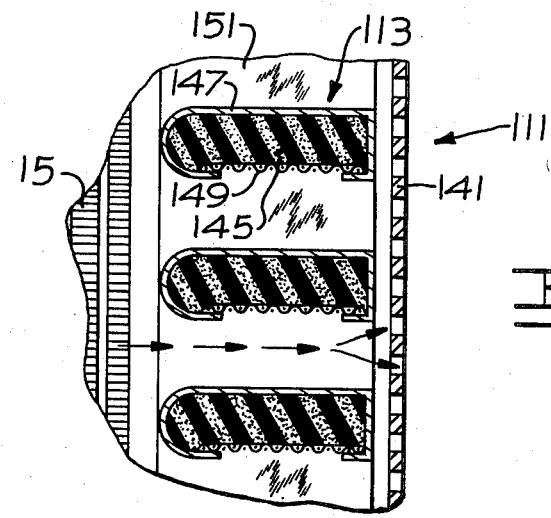
FIG. 13 is an enlarged, fragmentary, sectioned view of the radiator, acoustic baffles, and grill guard of the engine compartment enclosure shown in FIG. 11.

FIG. 13 shows in greater detail front panel 111 of FIG. 11 and its relationship with a front guard 141 and a radiator 15. Baffle elements 113 are similar to baffles 93 detailed in FIG. 10, except that the leading edge adjacent to the radiator is more rounded on baffle 113 to provide a different aerodynamic flow pattern between the baffles. This construction includes a foam core 145, held in place within metal case 147 by a screen 149. Case 147 is secured to vertical members 151 by welding or other means. The foam core is lightly compressed when in place and is removed by first depressing the bottom panel, lifting that panel away, and then removing the core.

The value of mounting the side panels on hinges is clearly shown in FIG. 14. By simply opening the side panel, access is provided to the engine and other accessories inside the enclosure. Side panel 95, previously shown in FIG. 7, contains baffle elements 97 having a section shape similar to baffle 93.

In FIG. 15, side panel 117 (previously illustrated in FIG. 11) is shown in section along with other portions of the enclosure. Panel 117 contains baffles 119 similar to baffles 125 detailed in FIG. 12. Conventional acoustic treatment, such as that used in the automotive industry as previously described, is placed upon the inside surfaces of the enclosure. Portions of the side wall 161 and hood 163 are lined with acoustic mats. Expanded metal elements 165 serve to support the acoustic mat which lines the rear wall of the enclosure. The mats are secured against the metal walls, or hood, by commercially-available clips (not shown). The clips coact with studs (also not shown) fastened to the walls to releasably retain the elements 165 against the mats.

Still another side-panel construction is illustrated in FIG. 16. Baffle elements 171 are inserted from one end, as previously described in reference to FIG. 5, through vertical plates such as 173 and 175. The vertical plates have openings slightly smaller than the nominal section shape of the baffle, causing the baffle to be lightly compressed by the plates. This panel also comprises outside plates 177, top plate 179, a corresponding bottom plate which is not shown, and a surrounding frame 181 which contains provisions for hinge-mounting the entire assembly.

The specific construction of baffle 171 is more clearly seen in FIG. 17. Acoustic foam batt 183 is cut to the desired length and then glued to a thin metal sheet 185. This assembly may then be hand formed to the inverted U-shape shown and inserted through the openings of the vertical plates.

Figure 18:
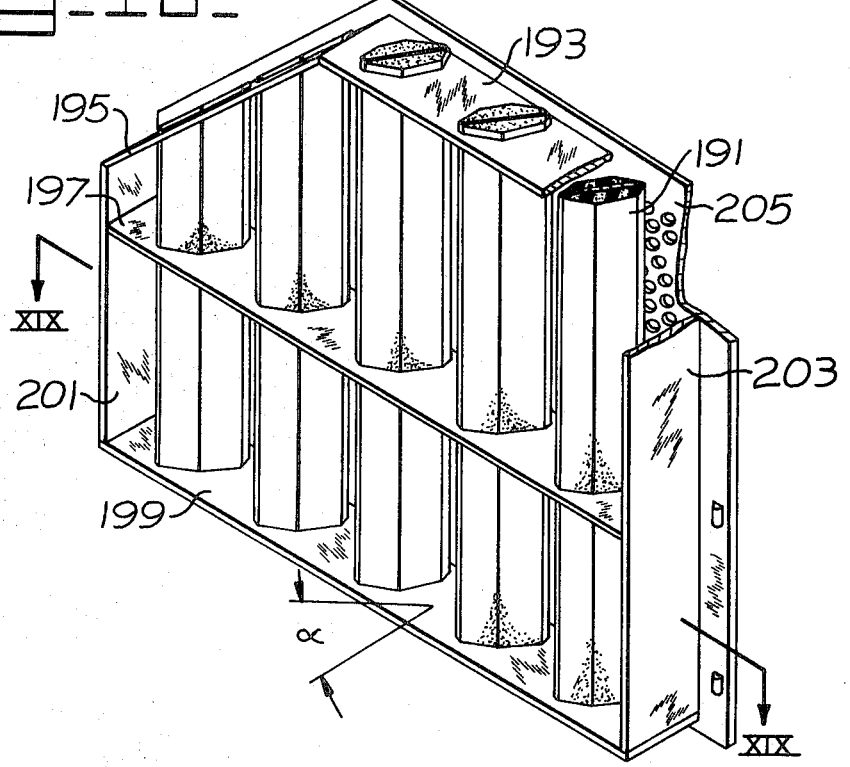
FIG. 18 is a partially-sectioned, isometric view of another acoustic side panel construction.
Figure 19:
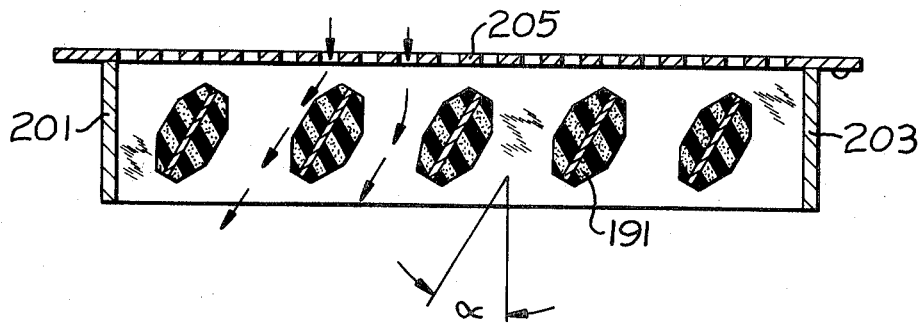
FIG. 19 is a sectional view taken along the line XIX—XIX in FIG. 18, showing details of the baffle construction.

One other side-panel configuration is presented in FIG. 18. Baffle elements 191, having a section and construction identical to baffles 11 detailed in FIG. 4, are similarly inserted through top plates 193 and 195, then through center horizontal plate 197, and come to rest on bottom plate 199. Side plates 201 and 203, and outside plate 205 complete this assembly. A section, taken in the direction of arrows XIX—XIX in FIG. 18, is shown in FIG. 19 and portrays the inclination angle $\alpha$ of elements 191, which provides directional control to air entering into the enclosure.

A method of mounting a baffle element by means of clips is presented in FIGS. 20 and 21. The baffle core, in this case comprising two rectangular-sectioned foam batts 211 and 213, is partially encased by wire grids 215 and 217. This assembly is lightly compressed and transversely inserted between frame members 219 and 221 to which metal clips 223, 225, 227 and 229 have been attached. The force of the partially-compressed baffle acting against the retaining clips effectively holds the assembly in place. In the event the external faces of the batts become contaminated with dust or oil, the assembly can be easily removed, the batts turned over, exposing a clean porous surface, and the unit replaced into the panel. This feature can double the normal service life of each baffle.

While only a few of the possible arrangements of baffles and panels have been specifically described herein, it is apparent that other combinations and baffle-section shapes are possible, without departing from the basic spirit of the present invention or the scope of the appended claims.

We claim:

1. An engine compartment enclosure for an earth-moving vehicle comprising two side portions, front and rear end portions, a hood member and bottom pan member, said side portions being generally inperforate except for panel means which consists of a plurality of sound-attenuating acoustic baffle means arranged in parallel, spaced-apart relationship to define air-flow passages therebetween for the transmission of cooling air between the interior of said engine enclosure and the exterior thereof, while substantially reducing the transmission of sound energy from the interior of the enclosure to the exterior, each said baffle means including an acoustic material batt and a relatively rigid structural support means for supporting said acoustic material batt.

2. The invention of claim 1 wherein said front end portion of said engine compartment enclosure contains a second panel means consisting of a plurality of elongated, sound-attenuating acoustic baffle means in parallel, spaced-apart relationship to provide air-flow passageways therebetween, said air-flow passageways in said front end portion cooperating with said air-flow passages in said side portions to provide a circulating air-flow pattern between said passages and said passageways while reducing sound transmission from the interior to the exterior of said engine compartment enclosure.

3. The invention as claimed in claim 2 wherein said baffle means in said front end portion are each arranged at an angle oblique to the vertical plane passing longitudinally through the horizontal center line of the vehicle with which the engine compartment enclosure is associated.

4. The invention of claim 1 wherein said side panel means are pivotally mounted in said side portions to provide facile access to the interior of said engine compartment enclosure for servicing and maintenance purposes.

5. The invention of claim 4 wherein said hood member is substantially imperforate except for third panel means consisting of a plurality of elongated, sound-attenuating acoustic baffle means in parallel, spaced-apart relationship to provide air-flow openings therebetween, said third panel means being pivotally mounted in said hood member to provide ready access to the interior of said engine compartment enclosure.

6. The invention of claim 1 wherein said sound-attenuating acoustic baffle means are readily removable from said panel means for facile cleaning and replacement pusposes.

7. The invention of claim 1 wherein said acoustic material batt of each said sound-attenuating acoustic baffle means includes an elongated central portion of flexible sound-energy absorbing material partially encased within said structural support means and wherein said support means includes a rigid frame partially comprised of imperforate sheet-metal and partially comprised of perforate material.

8. The invention of claim 7 wherein said imperforate, sheet-metal material portion of said rigid frame has a generally U-shaped, cross-sectional configuration which comprises two generally parallel leg portions connected by a transverse portion normal thereto, said perforate portion extending between said leg portions in parallel, spaced-apart relationship to said transverse portion and in holding contact with said elongated flexible central portion.

9. The invention of claim 7 wherein said flexible, sound-energy absorbing material is at least partially covered by a loosely-fitted, thin, nonmetallic sheet material which prohibits contamination of said sound-energy absorbing material without substantially impairing its sound-energy absorption characteristics.

10. The invention of claim 1 wherein each said baffle means comprises two layers of flexible, sound-energy abosrbing material fixedly mounted upon either side of a flat, rigid plate member which provides structural support for said flexible, sound-energy absorbing material.

11. The invention of claim 1 wherein each said baffle means comprises an elongated central portion of flexible, sound-energy absorbing material substantially completely enclosed in rigid perforate metal material.

12. The invention of claim 1 wherein said plurality of parallel, spaced-apart baffle means are arranged at an angle oblique to the plane of said hood member.

13. An engine compartment enclosure for an earthmoving vehicle comprising two side portions, front and rear end portions, a hood member and a bottom pan member, said side portions being generally imperforate except for a panel means which consists of a plurality of sound-attenuating acoustic baffle means arranged in parallel, spaced-apart relationship to define air-flow passages therebetween for the transmission of cooling air between the interior of said engine enclosure and the exterior thereof, while substantially reducing the transmission of sound energy from the interior of the enclosure to the exterior thereof, said sound-attenuating acoustic baffle means including an elongated central portion of flexible sound energy absorbing material partially encased within rigid frame means partially comprised of imperforate sheet-metal material and partially comprised of perforate material, said imperforate sheet-metal material portion having a generally U-shaped, cross-sectional configuration which comprises two generally parallel leg portions which are connected by a transverse portion normal thereto, and said perforate portion extending between said leg portions in parallel, spaced-apart relationship to said transverse portion and in holding contact with said elongated flexible central portion, one of said leg portions of said U-shaped frame means being folded obliquely toward the other said leg portion to form a smoothly-tapered aerodynamic surface which provides low resistance to air flow between said plural baffle means.

* * * * *